United States Patent
Lee et al.

(10) Patent No.: US 10,623,646 B1
(45) Date of Patent: Apr. 14, 2020

(54) CAMERA SYSTEM AND IMAGING METHOD OF CAMERA SYSTEM

(71) Applicant: TRIPLE WIN TECHNOLOGY(SHENZHEN) CO. LTD., Shenzhen (CN)

(72) Inventors: Ming-Hsun Lee, New Taipei (TW); Yen-Lin Peng, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/411,418

(22) Filed: May 14, 2019

(30) Foreign Application Priority Data

Apr. 9, 2019 (CN) .......................... 2019 1 0281035

(51) Int. Cl.
*H04N 5/232* (2006.01)
*G02B 7/02* (2006.01)

(52) U.S. Cl.
CPC ......... *H04N 5/23287* (2013.01); *G02B 7/028* (2013.01); *H04N 5/23212* (2013.01)

(58) Field of Classification Search
CPC .......... H04N 5/2253; H04N 5/23212–232133; H04N 5/2328; H04N 5/23287; G02B 7/09; G02B 7/28–40; G02B 27/64; G02B 27/646; G02B 7/008; G02B 7/028; G03B 3/10–12; G03B 13/32–36; G03B 5/00–08; G03B 2205/0007; G03B 2205/0015; G03B 2205/0023; G03B 2205/0038
See application file for complete search history.

(56) References Cited

U.S. PATENT DOCUMENTS

| 2002/0080260 A1* | 6/2002 | Ojima | H04N 5/232 348/348 |
| 2005/0063694 A1* | 3/2005 | Nakazawa | G02B 7/028 396/97 |
| 2018/0373013 A1* | 12/2018 | Okawa | G02B 21/245 |

FOREIGN PATENT DOCUMENTS

TW 201711447 A 3/2017

* cited by examiner

*Primary Examiner* — Paul M Berardesca
(74) *Attorney, Agent, or Firm* — ScienBiziP, P.C.

(57) ABSTRACT

A camera system includes a lens unit, an image sensor, a sensing unit, an adjustment unit, a memory, and a controller. The lens unit focuses reflected light to form an image. The image sensor converts the image formed by the lens unit into a digital image. The sensing unit senses an internal temperature of the camera system and an external temperature outside the camera system. The adjustment unit adjusts the lens unit. The memory stores preset adjustment amounts for adjusting the lens unit according to different internal temperatures of the camera system operating at different external temperatures. The controller receives the internal temperature and the external temperature sensed by the sensing unit, retrieves the corresponding preset adjustment amount from the memory according to the sensed temperatures, and controls the adjustment unit to adjust the lens unit according to the preset adjustment amount.

8 Claims, 2 Drawing Sheets

CAMERA SYSTEM AND IMAGING METHOD OF CAMERA SYSTEM

FIELD

The subject matter herein generally relates to camera systems, and more particularly to a camera system and an imaging method implemented in the camera system.

BACKGROUND

Generally, cameras that are installed in high-temperature or non-stable temperature environments utilize glass lenses. However, glass lenses are larger and heavier than plastic lenses and cannot be used in compacted cameras. Plastic lenses are small, but may deform in high-temperature or non-stable temperature environments.

BRIEF DESCRIPTION OF THE DRAWINGS

Implementations of the present disclosure will now be described, by way of embodiments, with reference to the attached figures.

DETAILED DESCRIPTION

Figure 1:
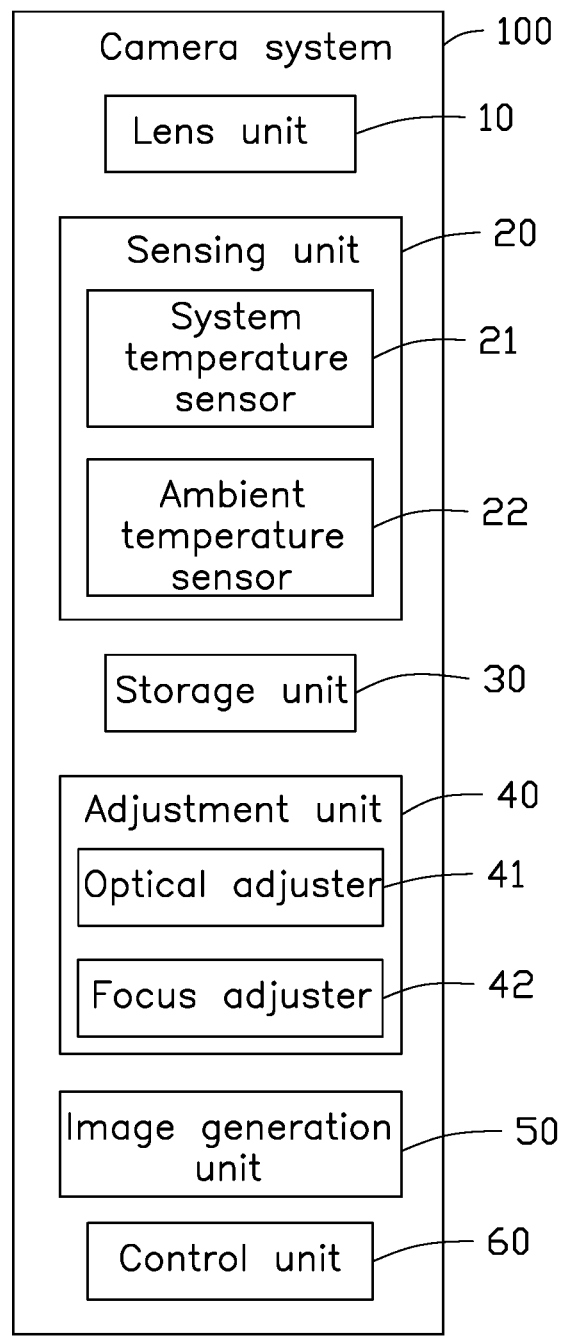
FIG. 1 is a block diagram of an embodiment of a camera system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of a camera system 100. The camera system 100 provides clear and stable camera functionality for devices operating in an environment having a high temperature or large temperature difference, such as in a vehicle.

The camera system 100 includes a lens unit 10, a sensing unit 20, a memory 30, an adjustment unit 40, an image sensor 50, and a controller 60. The lens unit 10 is configured to focus reflected light to form an image. The sensing unit 20 is configured to sense a temperature inside the camera system 100 and of the environment. The memory 30 stores a preset adjustment amount of the adjustment unit 40 for each temperature. The adjustment unit 40 is configured to adjust the lens unit 10. The image generating unit 50 is configured to convert an image formed by the lens unit 10 into a digital image. The sensing unit 20, the memory 30, and the adjustment unit 40 are electrically coupled to the controller 60.

The lens unit 10 includes a plurality of lenses. In one embodiment, the lenses of the lens unit 10 are made of plastic.

The sensing unit 20 includes a system temperature sensor 21 and an ambient temperature sensor 22. The system temperature sensor 21 is configured to sense the temperature inside the camera system 100. The ambient temperature sensor 22 is configured to sense the temperature of the environment.

The memory 30 stores a plurality of preset adjustment amounts for adjusting the lens unit 10 according to different internal temperatures of the camera system 100 operating at different temperatures of the external environment.

In one embodiment, the preset adjustment amounts are obtained by testing a focus of the lens unit 10 at different internal temperatures and different external temperatures in a laboratory or test center.

In one embodiment, the memory 30 is an Electrically Erasable Programmable Read-Only Memory (EEPROM), but is not limited thereto.

The preset adjustment amount includes an image adjustment amount and a focus adjustment amount.

The adjustment unit 40 includes an optical adjuster 41 and a focus adjuster 42.

The optical adjuster 41 is used for axial rotation adjustment of the lens unit 10 in a direction along a focal length of the lens unit 10, as well as along two mutually perpendicular directions perpendicular to the focal length.

The focus adjuster 42 is used for focus adjustment of the lens unit 10 in the direction along the focal length.

In one embodiment, the optical adjuster 41 performs 5-axis optical image adjustment of the lens unit 10 by feedback control of an inertial measurement unit (IMU) on an optical image stabilization (OIS) unit. Thus, stability of imaging of the camera system 100 is improved. The focus adjuster 42 controls the focal length of the lens unit 10 by controlling relative positions of the lenses in the lens unit 10 by a voice coil motor, a ball type circulation motor, or the like.

The image sensor 50 is configured to convert the image formed by the lens unit 10 into a digital image and transmit the digital image to a storage system or display system.

In other embodiments, the image sensor 50 is an image sensor embedded with a temperature sensor, which can sense the internal temperature of the camera system 100. Thus, the system temperature sensor 21 can be omitted.

The controller 60 is configured to receive the temperature inside the camera system 100 and the temperature of the external environment sensed by the sensing unit 20, retrieve the corresponding preset adjustment amount from the memory 30 according to the sensed temperatures, and control the adjustment unit 40 to adjust the lens unit 10 according to a preset adjustment amount.

Figure 2:
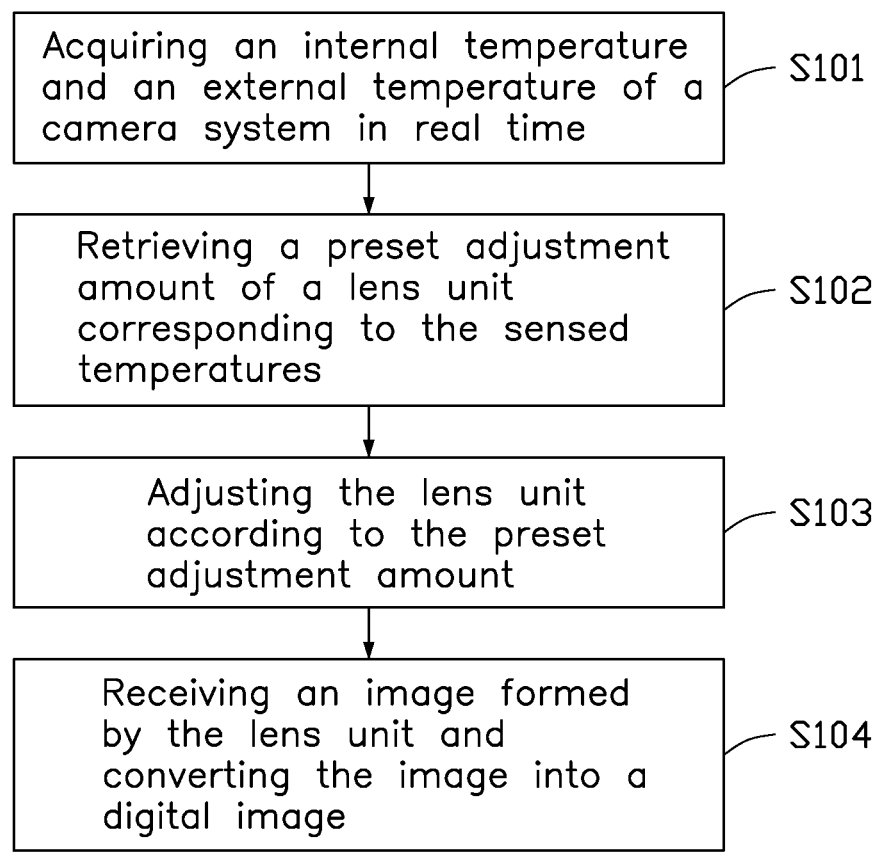
FIG. 2 is a flowchart of an imaging method implemented in a camera system.

FIG. 2 shows a flowchart of an imaging method implemented in a camera system 100. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S101, a temperature inside and outside the camera system 100 is acquired in real time.

In one embodiment, the temperature inside the camera system 100 and the temperature outside the camera system 100 are respectively acquired by a system temperature sensor 21 and an ambient temperature sensor 22.

At block S102, a preset adjustment amount of the lens unit 10 corresponding to the sensed temperatures are retrieved.

In one embodiment, a controller 60 receives the temperature inside the camera system 100 and the temperature outside the camera system 100, and retrieves a corresponding preset adjustment amount from a memory 30 according to a corresponding relationship stored in the memory 30.

At block S103, the lens unit 10 is adjusted according to the preset adjustment amount.

In one embodiment, the controller 60 controls an optical adjuster 41 and a focus adjuster 42 to respectively perform image adjustment and focus adjustment on the lens unit 10 according to the preset adjustment amount.

At block S104, an image formed by the lens unit 10 is received and converted into a digital image.

In one embodiment, the image formed by the lens unit 10 is received by the image generating unit 50, and the image is converted into a digital image.

The camera system 100 monitors the temperature inside and outside the camera system 100 through the sensing unit 20, and the corresponding preset adjustment amount in the memory 30 is retrieved by the controller 60. The adjustment unit 40 adjusts the lens unit 10 to maintain a clear and stable image acquired by the image generating unit 50. The lens unit 10 can be made of plastic and can adapt to different ambient temperatures. The camera system 100 has a simple structure and convenient operation, which can reduce system volume, reduce cost, and improve stability and image quality of the camera system 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera system comprising:
a lens unit focusing reflected light to form an image;
an image sensor converting the image formed by the lens unit into a digital image;
temperature sensors sensing an internal temperature of the camera system and an external temperature outside the camera system;
at least one adjuster adjusting the lens unit;
a memory storing a plurality of preset adjustment amounts for adjusting the lens unit according to different internal temperatures of the camera system operating at different external temperatures; and
a controller receiving the internal temperature and the external temperature sensed by the sensing unit, retrieving the corresponding preset adjustment amount from the memory according to the sensed temperatures, and controlling the at least one adjuster to adjust the lens unit according to the preset adjustment amount;
wherein the preset adjustment amount includes an image adjustment amount and a focus adjustment amount;
the at least one adjuster comprises an optical adjuster and a focus adjuster;
the optical adjuster performing adjustment by axial rotation of the lens unit in a direction along a focal length of the lens unit, as well as along two mutually perpendicular directions perpendicular to the focal length;
the focus adjuster performing focus adjustment of the lens unit in the direction along the focal length.

2. The camera system of claim 1, wherein:
the sensing unit comprises a system temperature sensor and an ambient temperature sensor;
the system temperature sensor sensing the internal temperature inside the camera system;
the ambient temperature sensor sensing the external temperature outside the camera system.

3. The camera system of claim 1, wherein:
the optical adjuster performs image adjustment of the lens unit by feedback control of an inertial measurement unit on an optical image stabilization unit.

4. The camera system of claim 1, wherein:
the focus adjuster controls the focal length of the lens unit by controlling relative positions of lenses in the lens unit by a voice coil motor or a ball type circulation motor.

5. An imaging method implemented in a camera system, the imaging method comprising:
acquiring an internal temperature and an external temperature of the camera system in real time;
retrieving a preset adjustment amount of a lens unit corresponding to the sensed temperatures;
adjusting the lens unit according to the preset adjustment amount;
receiving an image formed by the lens unit and converting the image into a digital image;
wherein the preset adjustment amount includes an image adjustment amount and a focus adjustment amount.

6. The imaging method of claim 5, wherein the step of acquiring an internal temperature and an external temperature of the camera system in real time comprises:
acquiring the internal temperature by a system temperature sensor;
acquiring the external temperature by an ambient temperature sensor.

7. The imaging method of claim 5, wherein the step of retrieving a preset adjustment amount of the lens unit corresponding to the sensed temperatures comprises:
receiving the sensed temperatures by a controller;
retrieving the preset adjustment amount from a memory of the camera system according to the sensed temperatures.

8. The imaging method of claim 5, wherein
axial rotation adjustment of the lens unit is performed by an optical adjuster in a direction along a focal length of the lens unit, as well as along two mutually perpendicular directions perpendicular to the focal length;
focus adjustment of the lens unit is performed by a focus adjuster in the direction along the focal length.

* * * * *